(12) United States Patent
Sands

(10) Patent No.: US 7,441,944 B2
(45) Date of Patent: Oct. 28, 2008

(54) DRINKING EXTENSION FOR BLENDER CONTAINER

(75) Inventor: Lenny Sands, Los Angeles, CA (US)

(73) Assignee: Homeland Housewares, LLC, Los Angeles, CA (US)

( * ) Notice: Subject to any disclaimer, the term of this patent is extended or adjusted under 35 U.S.C. 154(b) by 344 days.

(21) Appl. No.: 11/370,316

(22) Filed: Mar. 8, 2006

(65) Prior Publication Data

US 2006/0153003 A1    Jul. 13, 2006

Related U.S. Application Data

(63) Continuation-in-part of application No. 10/824,531, filed on Apr. 13, 2004, now Pat. No. 7,066,640, and a continuation-in-part of application No. 10/649,757, filed on Aug. 26, 2003, now Pat. No. 6,817,750.

(51) Int. Cl.
*A47J 43/046* (2006.01)
*A47J 43/06* (2006.01)

(52) U.S. Cl. .................... 366/205; 366/307; 366/314

(58) Field of Classification Search ................ 366/199, 366/205, 206, 314, 307; 241/282.1, 282.2; 99/348, 513; 222/480, 565; 215/329; 220/288
See application file for complete search history.

(56) References Cited

U.S. PATENT DOCUMENTS

| | | | |
|---|---|---|---|
| 1,480,914 A * | 1/1924 | Poplawski | 366/314 |
| 2,299,730 A | 10/1942 | Bornstein | 220/718 |
| 2,304,476 A * | 12/1942 | Poplawski | 241/282.2 |
| 2,530,455 A | 11/1950 | Forss | 241/282.2 |
| RE24,607 E | 2/1959 | Seyfried | 192/55.2 |
| 3,064,949 A | 11/1962 | Dewenter | 259/108 |

(Continued)

FOREIGN PATENT DOCUMENTS

DE    19602147    7/1997

(Continued)

OTHER PUBLICATIONS

STP America, Inc., Kiss Mixer Blender, Mar. 7, 2006. Published on http://kissmixer.com/feature/feature1.htm, Pertinent pp. 4.

(Continued)

*Primary Examiner*—Charles E Cooley
(74) *Attorney, Agent, or Firm*—Cislo & Thomas, LLP

(57) ABSTRACT

A blender system composed of a mixing base that is capable of agitating the contents of one or more containers. The mixing base includes a blade element, a recessed well positioned at a top of the mixing base, a pressure-actuated switch positioned about the periphery of the recessed well, and a locking groove. A container may have a single open end, a container body, a selectively removable container base, the container base sized to fit into the recessed well of the mixing base, the container base comprising a blade element and locking members to lock the container within the recessed well of the mixing base. The container body further comprises an attachment element for attaching the container base, and a substantially smooth extension between the attachment element and the open end of the container body to facilitate drinking or pouring the contents of the container body.

10 Claims, 9 Drawing Sheets

U.S. PATENT DOCUMENTS

| | | | |
|---|---|---|---|
| 3,085,710 A | 4/1963 | McIlroy | 220/90.4 |
| 3,101,857 A * | 8/1963 | Freedman | 215/396 |
| 3,315,946 A | 4/1967 | Nissman | 259/108 |
| 3,346,029 A * | 10/1967 | Harris, Jr. | 241/199.12 |
| 3,417,972 A * | 12/1968 | Conway | 241/199.12 |
| 3,504,816 A * | 4/1970 | Weichsel | 215/382 |
| 3,612,126 A | 10/1971 | Emmons et al. | 241/199.12 |
| 3,704,864 A | 12/1972 | Lee | 366/205 |
| 3,881,705 A | 5/1975 | Greenspan | 241/282.2 |
| 3,885,710 A * | 5/1975 | Cohen | 222/129 |
| 3,895,548 A * | 7/1975 | Sauve | 81/488 |
| 3,970,258 A | 7/1976 | Mantelet | 241/282.1 |
| 4,087,053 A * | 5/1978 | Voglesonger | 241/282.1 |
| 4,111,372 A | 9/1978 | Hicks et al. | 241/37.5 |
| 4,233,891 A * | 11/1980 | Schindler et al. | 99/348 |
| D260,350 S * | 8/1981 | Kahlcke | D7/378 |
| 4,345,517 A * | 8/1982 | Arao et al. | 99/511 |
| 4,397,427 A * | 8/1983 | Howard | 241/30 |
| 4,480,926 A | 11/1984 | Lattery, Jr. et al. | 366/251 |
| 4,487,509 A | 12/1984 | Boyce | 366/199 |
| 4,542,857 A * | 9/1985 | Akasaka | 241/37.5 |
| D281,945 S | 12/1985 | Boyce | D7/378 |
| 4,561,782 A * | 12/1985 | Jacobsen et al. | 366/349 |
| 4,708,487 A | 11/1987 | Marshall | 366/206 |
| 4,714,203 A | 12/1987 | Williams | 241/36 |
| 4,723,719 A | 2/1988 | Williams | 241/282.2 |
| 4,889,248 A | 12/1989 | Bennett | 215/390 |
| 5,302,021 A * | 4/1994 | Jennett et al. | 366/348 |
| 5,323,973 A * | 6/1994 | Ferrara, Jr. | 241/37.5 |
| 5,355,784 A * | 10/1994 | Franklin et al. | 99/492 |
| 5,446,995 A * | 9/1995 | Huber | 47/86 |
| 5,479,851 A * | 1/1996 | McClean et al. | 99/512 |
| 5,500,967 A * | 3/1996 | Wilson et al. | 8/158 |
| 5,580,926 A * | 12/1996 | Shalati et al. | 525/108 |
| 5,636,923 A * | 6/1997 | Nejat-Bina | 366/205 |
| 5,639,161 A | 6/1997 | Sirianni | 366/314 |
| 5,662,032 A | 9/1997 | Baratta | 99/513 |
| 5,690,021 A | 11/1997 | Grey | 99/513 |
| 5,720,552 A | 2/1998 | Schindlegger | 366/197 |
| 5,863,118 A * | 1/1999 | Ackels et al. | 366/129 |
| 5,882,113 A | 3/1999 | Binder | 366/205 |
| 5,911,504 A | 6/1999 | Schindlegger, Jr. | 366/197 |
| 6,065,861 A | 5/2000 | Chen | 366/144 |
| 6,135,019 A | 10/2000 | Chou | 99/513 |
| 6,193,407 B1 * | 2/2001 | Kubicz | 366/205 |
| 6,223,652 B1 | 5/2001 | Calia et al. | 99/513 |
| D445,634 S * | 7/2001 | Feil | D7/378 |
| D470,050 S | 2/2003 | Renz et al. | D9/434 |
| D487,668 S * | 3/2004 | Sands | D7/378 |
| 6,758,592 B2 | 7/2004 | Wulf et al. | 366/205 |
| 6,786,440 B2 * | 9/2004 | Ling et al. | 241/301 |
| 6,796,705 B1 | 9/2004 | Khubani | 366/197 |
| 6,817,750 B1 * | 11/2004 | Sands | 366/205 |
| D499,603 S * | 12/2004 | Nikkhah | D7/378 |
| D500,633 S * | 1/2005 | Sands | D7/396.2 |
| D501,759 S * | 2/2005 | Sands | D7/536 |
| D517,862 S * | 3/2006 | Sands | D7/396.2 |
| D519,321 S * | 4/2006 | Sands | D7/523 |
| D521,802 S * | 5/2006 | Sands | D7/396.2 |
| 7,040,799 B2 * | 5/2006 | Pryor, Jr. | 366/199 |
| 7,063,456 B2 * | 6/2006 | Miller et al. | 366/205 |
| 7,066,640 B2 * | 6/2006 | Sands | 366/205 |
| D532,255 S * | 11/2006 | Sands | D7/413 |
| D532,648 S * | 11/2006 | Sands | D7/376 |
| D536,216 S * | 2/2007 | Sands | D7/507 |
| 7,220,049 B2 * | 5/2007 | Lee | 366/206 |
| D546,118 S * | 7/2007 | Sands | D7/376 |
| 7,267,478 B2 * | 9/2007 | Miller et al. | 366/205 |
| 7,278,779 B2 * | 10/2007 | Beesley et al. | 366/205 |
| D554,426 S * | 11/2007 | Sands | D7/378 |
| D554,427 S * | 11/2007 | Sands | D7/378 |
| D557,559 S * | 12/2007 | Sands | D7/413 |
| D563,164 S * | 3/2008 | Sands | D7/413 |
| 7,364,348 B1 * | 4/2008 | Jones | 366/130 |
| 7,371,004 B1 * | 5/2008 | Branson et al. | 366/130 |
| 7,384,182 B2 * | 6/2008 | Bhavnani | 366/130 |
| 2001/0036124 A1 | 11/2001 | Rubenstein | 366/205 |
| 2002/0012288 A1 | 1/2002 | Masip | 366/205 |
| 2003/0193833 A1 * | 10/2003 | Wulf et al. | 366/142 |
| 2003/0213373 A1 | 11/2003 | Dickson, Jr. | 99/348 |
| 2003/0214875 A1 | 11/2003 | Dickson, Jr. | 366/206 |
| 2003/0230658 A1 * | 12/2003 | Ling et al. | 241/282.1 |
| 2004/0173105 A1 * | 9/2004 | Kim et al. | 99/472 |
| 2005/0047272 A1 * | 3/2005 | Sands | 366/199 |
| 2005/0068846 A1 * | 3/2005 | Wulf et al. | 366/199 |
| 2005/0068847 A1 * | 3/2005 | Sands | 366/205 |
| 2005/0122837 A1 * | 6/2005 | Bravard et al. | 366/199 |
| 2005/0185507 A1 * | 8/2005 | Beesly et al. | 366/205 |
| 2005/0207270 A1 * | 9/2005 | Beesley | 366/205 |
| 2005/0229795 A1 * | 10/2005 | Stuckey | 99/510 |
| 2006/0007779 A1 * | 1/2006 | Fernandez et al. | 366/206 |
| 2006/0120215 A1 * | 6/2006 | Sands | 366/197 |
| 2006/0153003 A1 * | 7/2006 | Sands | 366/205 |
| 2006/0176770 A1 * | 8/2006 | Sands | 366/205 |
| 2006/0209627 A1 * | 9/2006 | McGill | 366/205 |
| 2007/0147171 A1 * | 6/2007 | Reyes et al. | 366/205 |
| 2007/0183256 A1 * | 8/2007 | Sands | 366/205 |
| 2008/0196602 A1 * | 8/2008 | Sands | |

FOREIGN PATENT DOCUMENTS

| | | | |
|---|---|---|---|
| EP | 0562310 | | 9/1993 |
| JP | 01145030 A * | | 6/1989 |
| JP | 04017820 A * | | 1/1992 |
| JP | 5-199944 | | 8/1993 |
| JP | 05199943 A * | | 8/1993 |
| JP | 05245052 A * | | 9/1993 |
| JP | 6-319656 | | 11/1994 |
| JP | 07204110 A * | | 8/1995 |
| JP | 07227165 A * | | 8/1995 |
| JP | 07227166 A * | | 8/1995 |
| JP | 07231856 A * | | 9/1995 |
| JP | 08196439 A * | | 8/1996 |
| JP | 9-65988 | | 3/1997 |
| JP | 10-117944 | | 5/1998 |
| JP | 11-137454 | | 5/1999 |
| JP | 2000-201837 | | 7/2000 |
| JP | 2000-201838 | | 7/2000 |
| JP | 2002-177155 | | 6/2002 |
| JP | 2002-291627 | | 10/2002 |
| JP | 2002-336139 | | 11/2002 |
| JP | 2003-259995 | | 9/2003 |
| JP | 2003259994 A * | | 9/2003 |
| JP | 2004-16693 | | 1/2004 |
| JP | 2005066351 A * | | 3/2005 |
| JP | 2005-177126 * | | 7/2005 |
| JP | 2006-061639 * | | 3/2006 |
| JP | 2006-231085 * | | 9/2006 |
| JP | 2007275503 A * | | 10/2007 |
| WO | WO 03/003888 | | 1/2003 |
| WO | WO 03/005871 | | 1/2003 |
| WO | WO 03/075726 | | 9/2003 |
| WO | WO 2006117444 A1 * | | 11/2006 |
| WO | WO 2007126409 A2 * | | 11/2007 |

OTHER PUBLICATIONS

STP America, Inc., Kiss Mixer Blender, Mar. 7, 2006. Published on http://kissmixer.com/order/orderl.htm, Pertinent pp. 2.

STP America, Inc., Kiss Mixer Blender, Mar. 7, 2006. Published on http://kissmixer.com/order/asl.htm, Pertinent pp. 3.

* cited by examiner

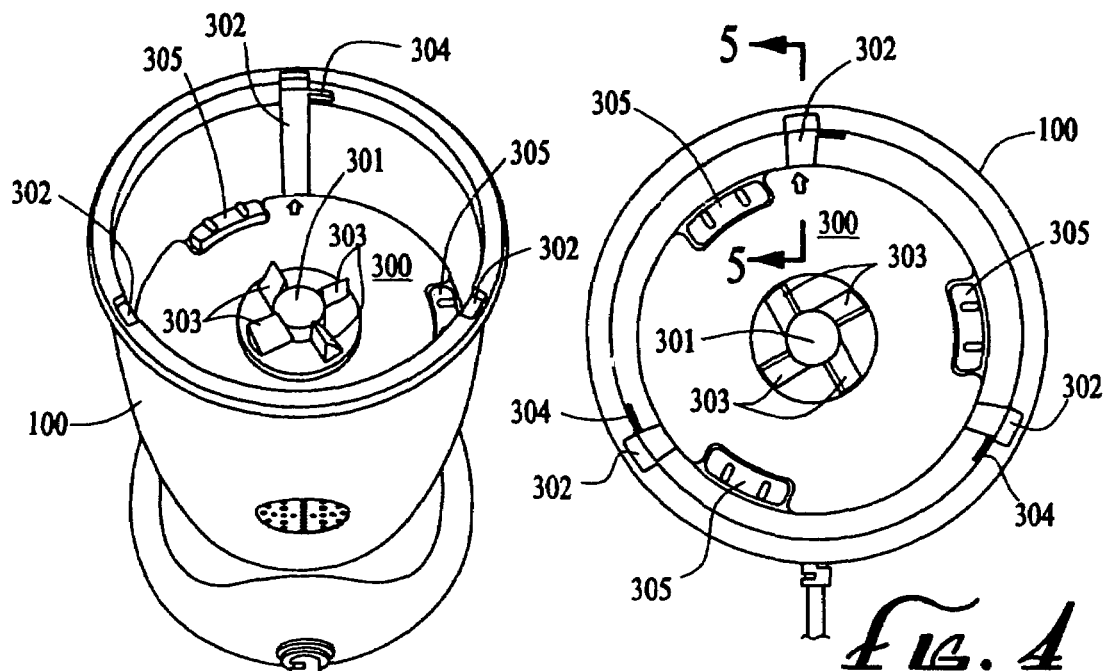
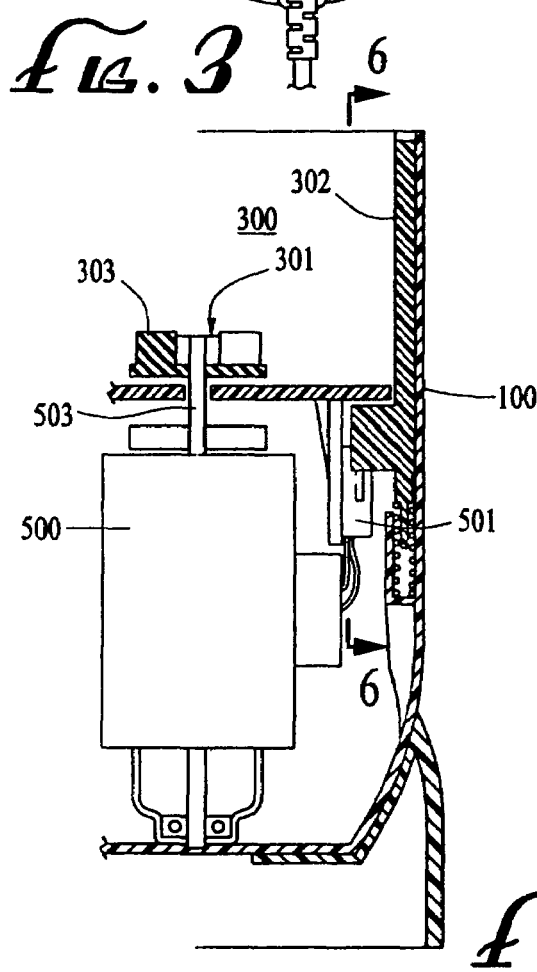
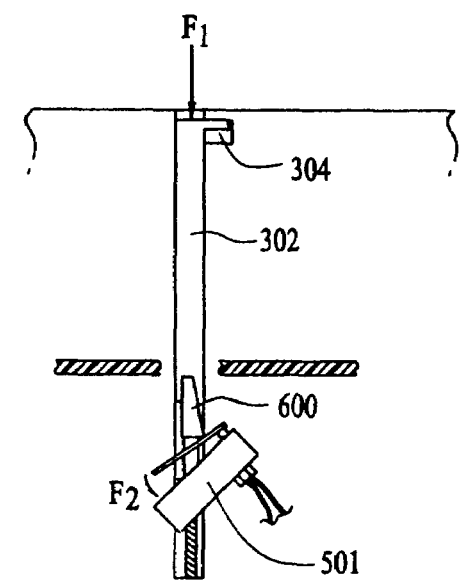

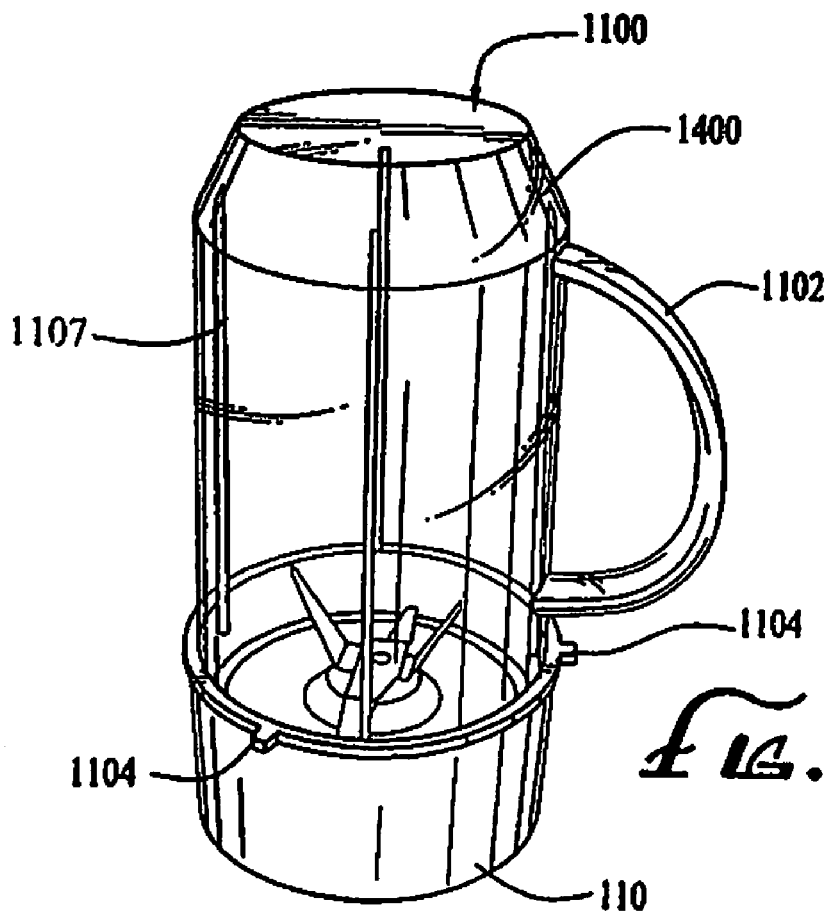
FIG. 14
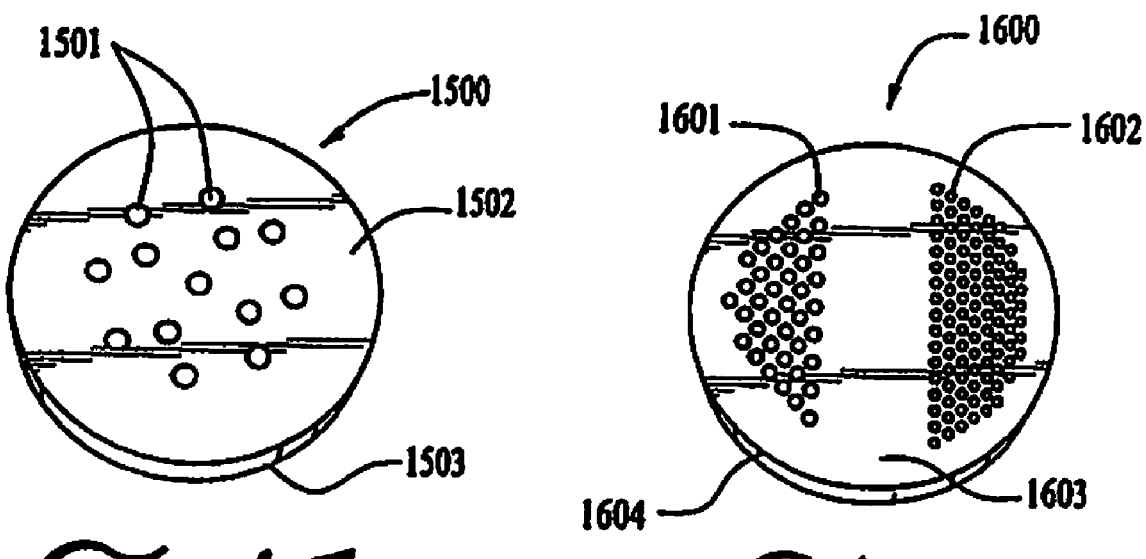
FIG. 15
FIG. 16

DRINKING EXTENSION FOR BLENDER CONTAINER

CROSS REFERENCE TO RELATED APPLICATION

This is a continuation-in-part of U.S. patent application Ser. No. 10/824,531, filed Apr. 13, 2004, and issued as U.S. Pat. No. 7,066,640 B2 on Jun. 27, 2006, which is a continuation-in-part of U.S. patent application Ser. No. 10/649,757, filed on Aug. 26, 2003, and issued as U.S. Pat. No. 6,817,750 B1 on Nov. 16, 2004, both of which are incorporated in their entirety by reference.

TECHNICAL FIELD

This invention relates to the field of small appliances. More particularly, this invention relates to the field of kitchen appliances. Even more particularly, this invention relates to the field of electric blenders and containers related thereto.

BACKGROUND ART

Various devices for blending various liquids and solids have been developed over the years. These devices have various features and options to suit a wide variety of uses and applications. For example, there are many blenders that are either handheld or freestanding devices. While these devices have been useful, these prior art devices can be difficult to clean, use and store unused products, especially, when preparing smaller batches. More specifically, freestanding devices can be too large and cumbersome to use to make smaller portions and are generally better designed for blending larger quantities of fluids and ingredients. Handheld units may be useful to make individualized portions, but they may lack the power to properly blend ingredients together. Furthermore, these handheld units are generally used with open containers such as bowls or cups that can increase the chances of spilling or splattering during preparation of the ingredients. Moreover, the unused portion would have to be poured out of the open container and into a sealable container to be stored or to be readily carried by a person. In addition, such units are generally impractical to use for casually consuming the resulting blended concoction, given their attached mechanical base and/or threaded edges. Accordingly, there remains a need for an individualized blender system that may be easier to use, clean, and store unused products, as well as be used to consume their contents.

DISCLOSURE OF THE INVENTION

Exemplary embodiments disclosed here are directed to an individualized blender system. According to one exemplary embodiment, the blender system is composed of a base including a motor means, an individual-sized container and a blender container. The base includes a body, a motor means, an agitating means coupled to the motor, a recessed well for receiving a container and a pressure-sensitive switch that selectively powers the motor means. In use, the individual-sized container is attached to the agitating means, placed on the base, pressure is applied to the container thereby activating the motor means and agitating the contents of the container.

According to one exemplary embodiment, the individually sized container may be shaped like an elongated dome. In alternate embodiments, the container may have a cylindrical, polygonal, cubical, or pyramidal shape. Also, the container may be sealed with a simple cap or a cap having an agitating means. The container may also include standing element, such as a plurality of ridges that form a stable platform for standing the container like a typical drinking vessel. That is, the bullet-shape container may be inverted so that the container rests on the ridges, and the cap is readily accessible. In alternate embodiments this standing element may take on a variety of shapes. Additionally, the container may include locking members that engage the locking grooves provided on the mixing base. Additionally, the container may include threads as an attachment means for the simple cap or a cap having an agitating means, and may also have an extension beyond the threads that is substantially smooth. In alternative embodiments, the container may have a variety of other means to attach the container to the caps.

According to one exemplary embodiment, the blender canister includes, at a minimum, a body, a selectively removable base having an agitating means, locking members that engage the locking grooves provided on the mixing base and a selectively removable means for sieving the container contents. In use, with the sieving means provided in the body of the blender canister, fruits and vegetables may be placed and blended within the bore of the sieving means. The pulp remaining from the fruits and vegetables remain the bore of the sieving means and the resultant juice may be decanted from the blender canister. Alternatively, the blender canister may be used without the removable means for sieving the container contents.

BRIEF DESCRIPTION OF THE DRAWINGS

FIG. 3 is a perspective view of an exemplary embodiment of a mixing base;

FIG. 4 is a top plan view of FIG. 3;

FIG. 5 is a cross-sectional view of an exemplary embodiment of a mixing base taken along line 5-5 of FIG. 4;

FIG. 6 is a cross-sectional view of an exemplary embodiment of a mixing base taken along line 6-6 of FIG. 5;

FIG. 14 is a perspective view of one embodiment of a mug that is coupled to a blender base;

FIG. 15 is a perspective view of a top for a blender container; and

FIG. 16 is another embodiment of a top for a blender container.

MODES FOR CARRYING OUT THE INVENTION

The detailed description set forth below in connection with the appended drawings is intended as a description of exemplary embodiments and is not intended to represent the only forms in which the exemplary embodiments may be constructed and/or utilized.

Figure 1:
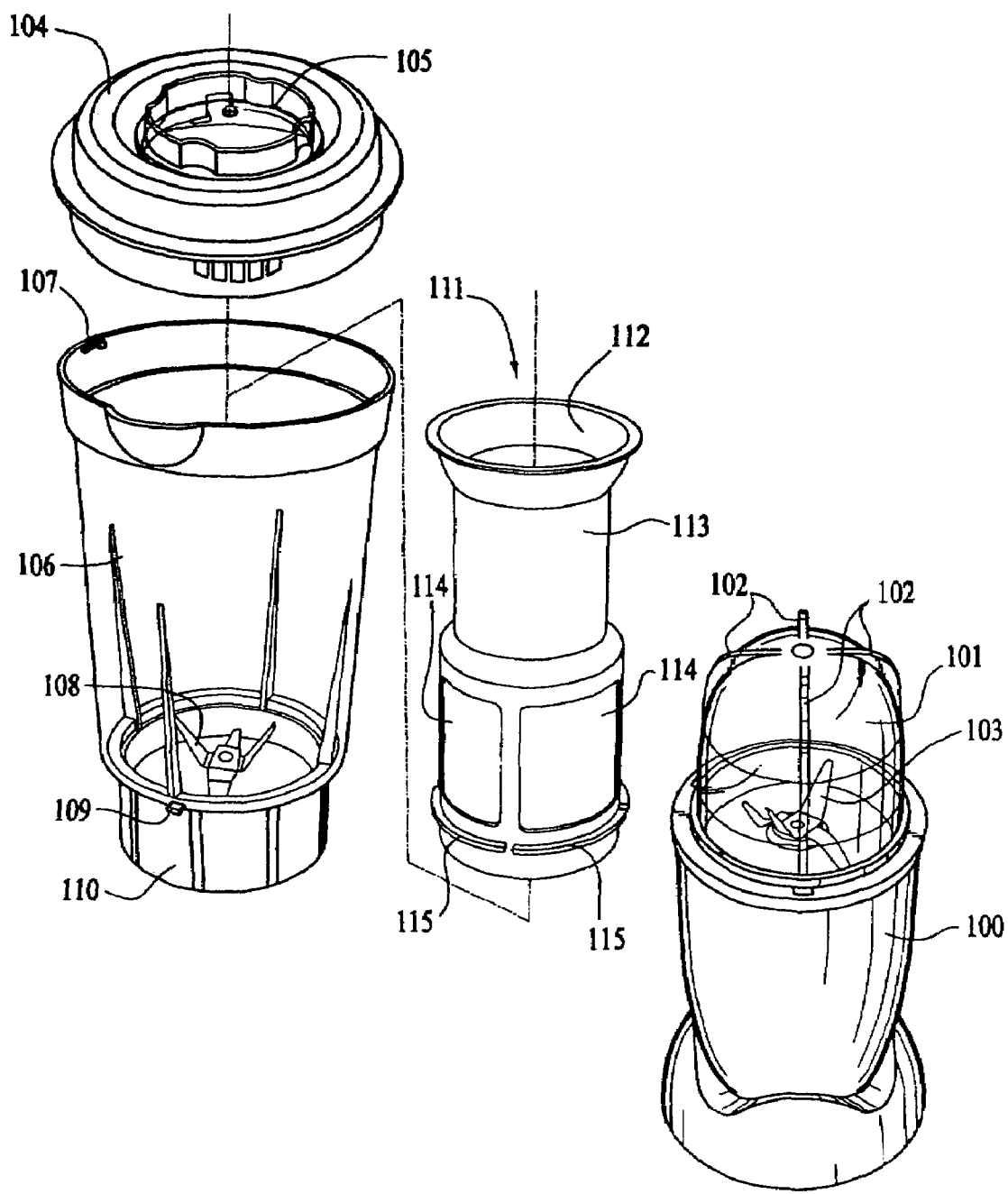
FIG. 1 is a perspective view of an exemplary embodiment of the blender system.

Turning to the drawings, FIG. 1 is directed to an exemplary embodiment of an individualized blender system. More specifically, FIG. 1 shows a container 101 engaged to a mixing base 100 and a blender container 106. As shown in the exemplary embodiment of FIG. 1, the container body 101 is a elongated dome-shaped container. As those skilled in the art will appreciate, the container 101 may have a plurality of shapes known or developed in the art. Also, the container 101 may include a plurality of ridges 102 provided on the outer surface of the container 101. Selectively attached to the container body 101 is a means 103 for agitating the contents of the container. The means for agitating the container contents can be a blade element coupled to an impeller in a shaft or other transmission means. The blade element may have one, two, three, four, or more cutting elements. The cutting elements are generally flat members that may have sharpened edges, pointed tips, and one or more bends along the surface of the cutting elements.

The blender container 106 also includes a base 110, selectively removable lid 104, 105, and a base member 110 that is coupled to an agitating means 108. As shown in FIG. 1, the lid is composed of two components, but it is contemplated that a one-piece or multi-piece cap may also be used. The lid 104 may be locked on to the opening of the container 106 via a cap-locking member 107. The cap-locking member 107 may be an L-shaped ridge located at the lip of the container 106. The cap-locking member 107 engages a corresponding member (not shown) on the lid 104 in order to securely fix the lid 104 to the container 106.

According to one exemplary embodiment, the blender container 106 may include a juicer member 111. The juicer element 111 is composed of a main body 113 and a plurality of sieve elements 114 spaced about the periphery of the main body 113. According to the exemplary embodiment depicted in FIG. 1, the juicer element 111 may also include a funnel 112 at one end of the main body 113. Additionally, the juicer element 111 may also include an annular stop member 115 positioned at one end of the juicer so as to prevent over-insertion of the juicer element 111 into the blender container 106.

Figure 2A:
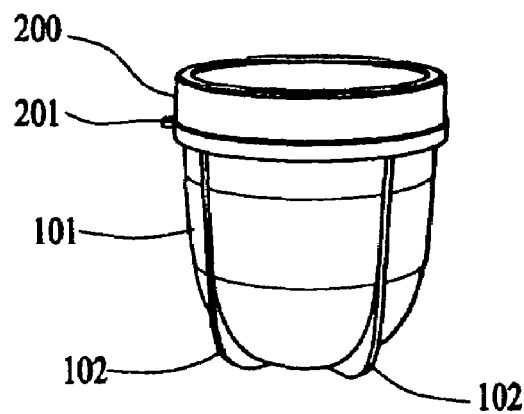
FIG. 2A is a perspective view of an exemplary embodiment of an individualized blender container.
Figure 2B:
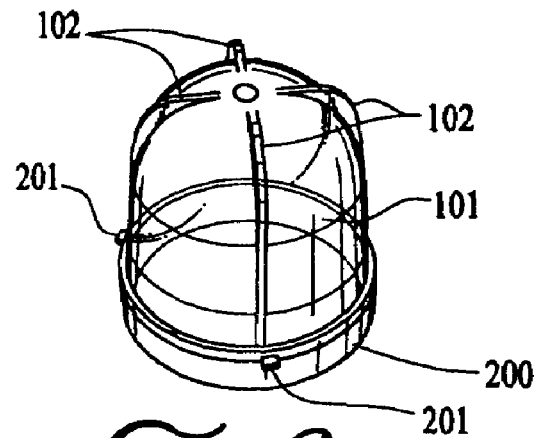
FIG. 2B is an inverted perspective view of FIG. 2A.
Figure 2C:
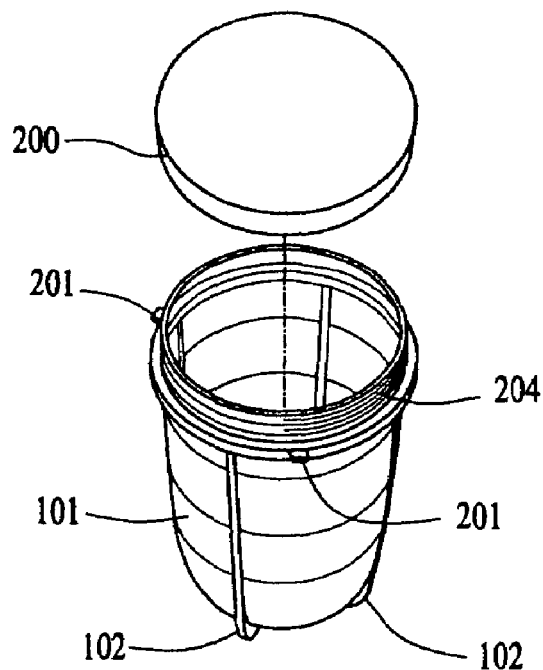
FIG. 2C is an exploded perspective view of FIG. 2A.

FIGS. 2A through 2C illustrate various views of the individualized container 101. That is, an individualized container body 101 is sized for smaller servings that would be prepared/consumed by one and/or a few individuals. As shown in FIG. 2A, the container body 101 is resting on external ridges 102. The external ridges 102 are shaped so as to permit the container body 101 to rest on the apex of the container body 101 without tipping over. As those skilled in the art will appreciate, the number of ridges may be varied from what is depicted so long as the container can stand upright on a substantially flat surface. As shown in FIG. 2A, the container body 101 may be used as a drinking or storage vessel. That is, an individual may blend contents of the container body 101, remove the container body 101, mixing base 100, container base 202, access the contents of the container, and secure the cap 200 onto the container 101 to store for later use.

Figure 2D:
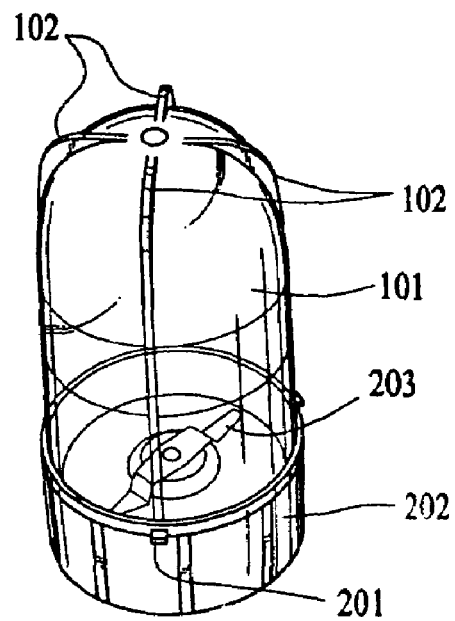
FIG. 2D is a perspective view of another exemplary embodiment of an individualized blender container.

In one configuration, the container body 101 may be also enclosed with a cap 200. In an alternate configuration, the container may be enclosed with a container base 202 having an agitating means as shown in FIG. 2D. As shown in FIG. 2C, the cap 200 may be affixed to the opening of the container body 101 by threads 204. As those skilled in the art will appreciate, in alternate embodiments the cap 200 may be secured to the container body 101 by various known and developed means such as, but not limited to, a friction fit or a snap-fit. As shown in FIG. 2B, the container body 101 is inverted and may rest on the cap 200.

FIG. 2D illustrates an alternate embodiment of the container body 101 having a larger volume as compared to the embodiments depicted in FIGS. 2A-2C. Also, the container base 202 includes another exemplary embodiment of an agitating means 203. Additionally, as shown in FIGS. 2A through 2C, the container body 101 includes locking members 201 that are spaced about the periphery of the container body 101. The locking members 201 allow the user to operate the blender without requiring the constant application of force to the container (in order to keep the motor means switched on).

FIG. 3 is directed to the mixing base 100 and the various components that are associated with the base's recessed well 300. The mixing base 100 includes a motor means (not shown) that is coupled to an impeller 301. The impeller 301 includes a plurality of blades 303 that radiate from the center of the impeller 301. Along the periphery of the recessed well 300, a plurality of bushings 305 may be placed about the periphery of the recessed well 300. In another exemplary embodiment of the mixing base 100, the base does not include the bushings 305. The bushings 305 may be made from a generally resilient material such as, but not limited to, rubber or silicone that may serve to reduce the vibrations during the agitation of the container contents. Also, as shown in FIG. 3, the recessed well 300 includes a plurality of pressure-activated switches 302. In use, the weight of the container 101 or the blender container 106 causes the downward movement of the switch 302 thereby activating the motor means. As shown in FIG. 3, a locking groove 304 may be provided adjacent to and extending perpendicularly away from the pressure-activated switch 302. Accordingly, in use, when the locking members 201 contact and depress the switch 302, the container 101, 106 may be rotated such that the locking member 201 engages the locking groove 304. That is, as shown in FIG. 6, when a force $F_1$ is applied to the switch 302, the switch 302 moves downward. This downward motion causes the cam 600 on the switch 302 to contact a switching means 501 that is connected to the motor 500 thereby powering the motor. Accordingly, depending on the intended use or application, the container 101, 106 may be depressed to activate the motor 500 for short periods of time. Alternatively, the container 101, 106 may be depressed and rotated slightly so as to allow the locking members 201 to engage the locking groove 304 to permit the continued operation of the motor 500 without requiring the user to exert constant pressure to keep the motor powered. Although the locking members 201 and locking groove 304 add a level of convenience to the blender, they are not essential to its operation, and may be omitted in an alternate embodiment that uses a simple downward motion to activate the switch 302.

Figures 7, 8, 9:
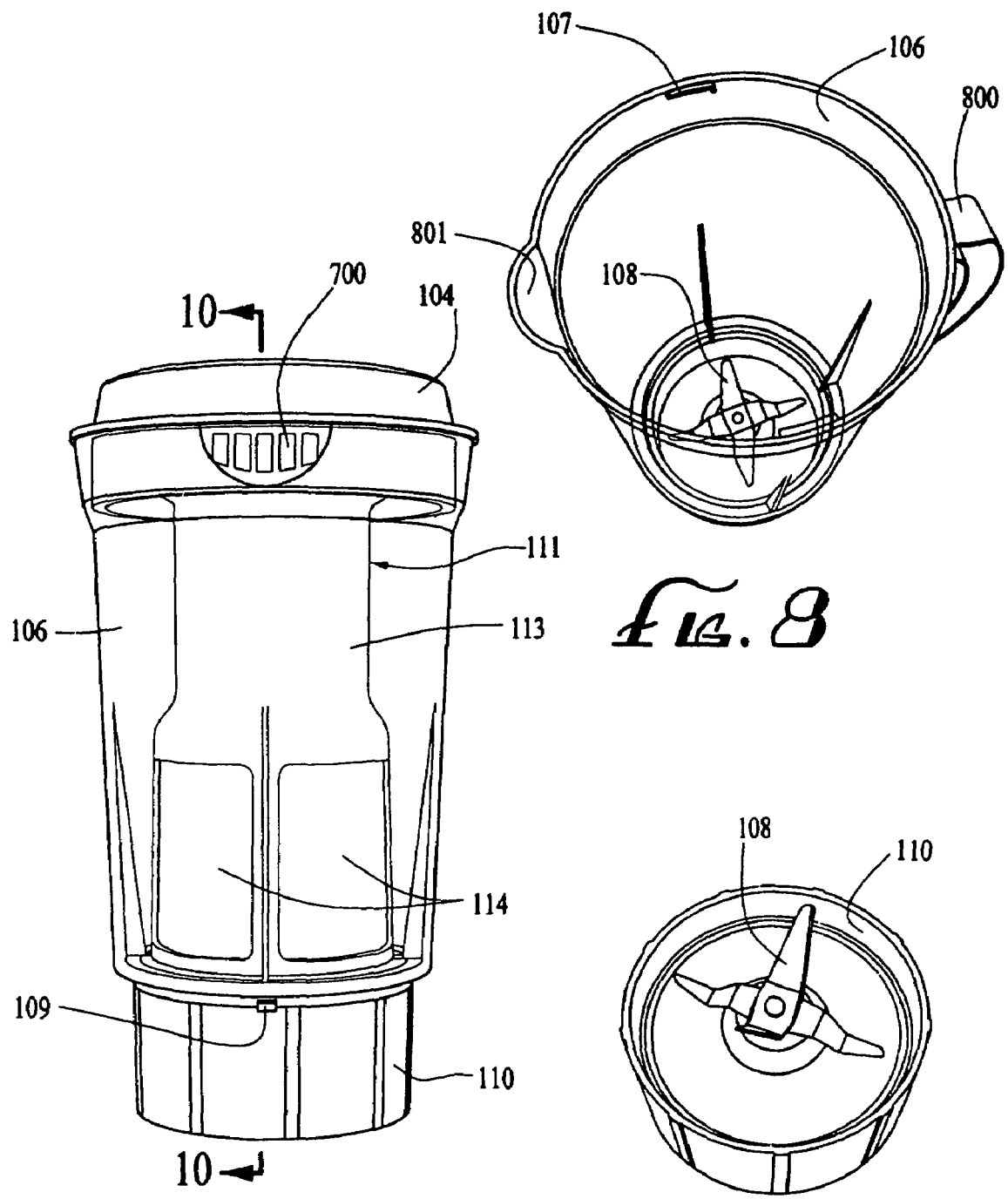
FIG. 7 is a side view of an exemplary embodiment of a blender container.
FIG. 8 is a perspective view of an exemplary embodiment of a blender container.
FIG. 9 is a perspective view of an exemplary embodiment of blender container base.

FIG. 7 is directed to an exemplary embodiment of the blender container 106. The blender container comprises a main body that defines a volume and a lid 104, 105 that is affixed thereto. The lid includes a plurality of openings 700 that may be used to decant the contents of the container 106 while the lid 104 remains affixed to the container 106. The blender container 106 also includes a base 110. The base is sized to fit within the recessed well 300. Also, the base is coupled to the container 106 by a screw-fit relation. The base 110 also includes an agitating means 108, as shown in FIG. 9. Turning back to FIG. 7, the blender container 106 also includes a plurality of locking members 109 spaced about the periphery of the blender container 106 near the base 110 of the container 106. The blender container 106 also has at least one interior ridge 123. As shown in the exemplary blender container 106 depicted in FIG. 7, a juicer 111 may be provided within the body of the blender container 106. As those skilled in the art will appreciate, the blender container 106 may be used without the juicer 111. The blender container 106 may include a handle 800 and a spout 801 that facilitates the decanting of the contents of the container.

Figure 10:
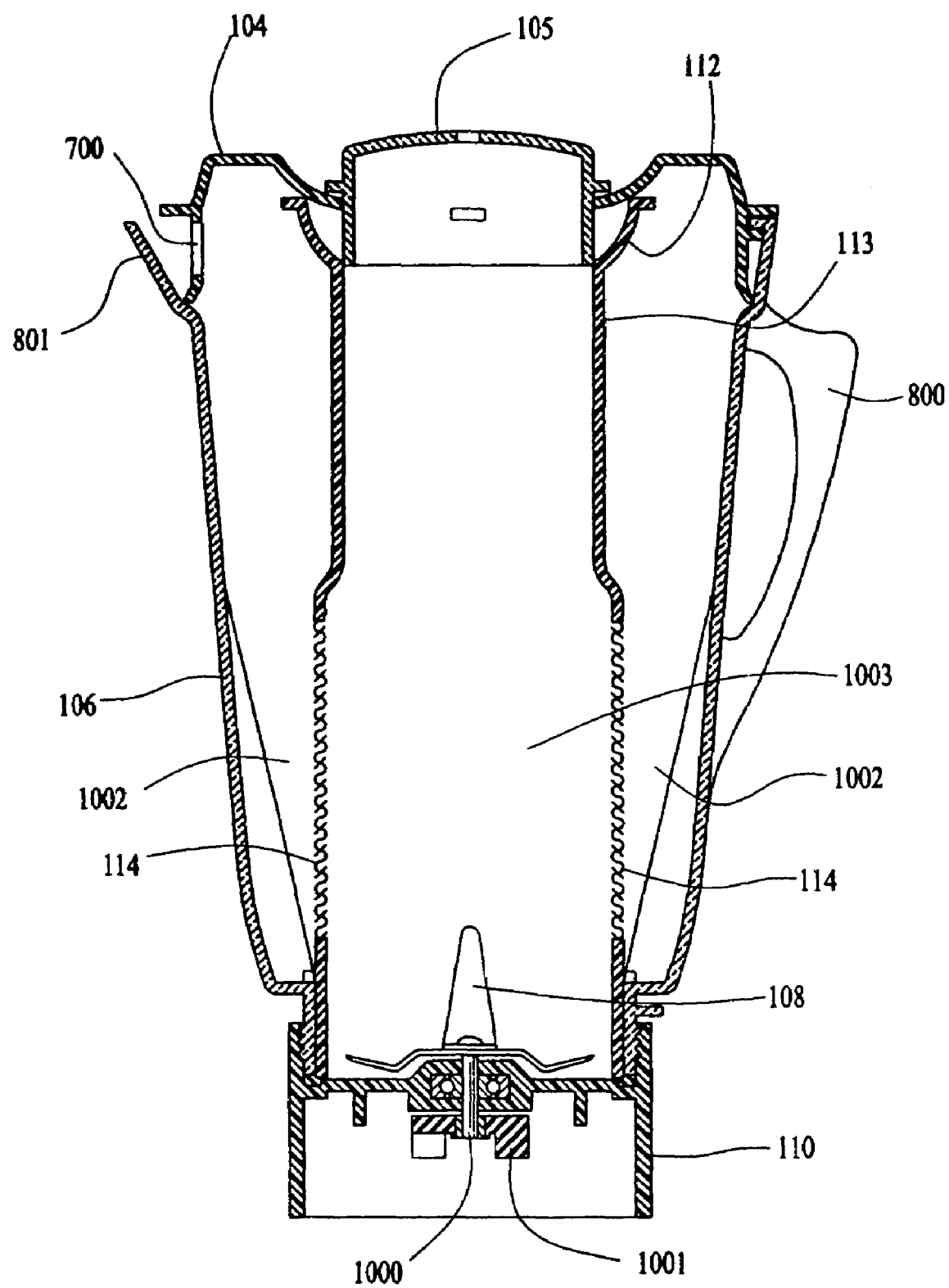
FIG. 10 is a cross-sectional view of an exemplary embodiment of blender container taken along line 10-10 of FIG. 7.

FIG. 10 illustrates the cross-sectional view of the blender container 106. The cross-sectional view shows the juicer element 111 placed within the body of the blender container 106. As shown in FIG. 10, the juicer element 111 is secured to the bottom of the blender container 106. Additionally, the bore of the juicer 111 may be accessed by removing cap element 105. In use, fruits and/or vegetables may be placed into the bore 1003 of the juicer 111. Rotation of the motor means is transmitted through shaft 1000 and mating impeller 1001 thereby transmitting a rotational force to the agitating means 108. The contents of the juicer 1003 are then blended thereby causing the resulting juice to move from the bore 1003 into the container body 1002 through the sieve elements 114. The remaining pulp is separated and trapped within the bore 1003 of the juicer 111. By providing a two-part cap 104, 105, an individual user can access the bore 1003 of the juicer 111 without removing the entire cap or stopping the machine for fear of spillage or splattering. For example, the individual user may remove cap 105 to access the bore 1003 of the juicer 111 to add more products for juice extraction. The resulting juice that is located within the space 1002 may be decanted from the container without removing the lid through the openings.

Figure 11A:
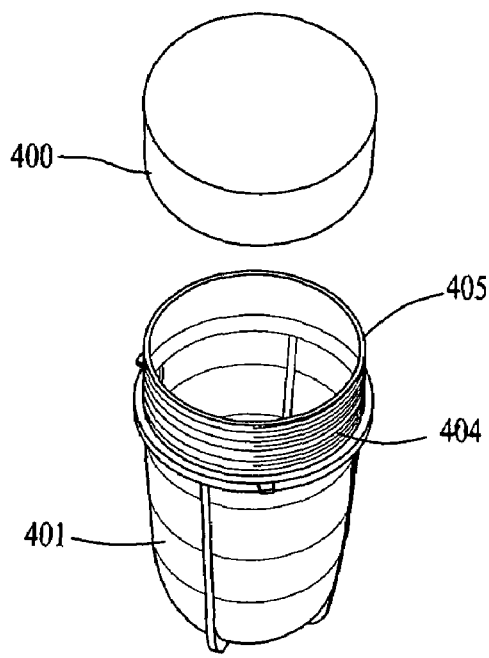
FIG. 11 is a perspective view of one embodiment of a mug that may be used with the blender.
Figure 11B:
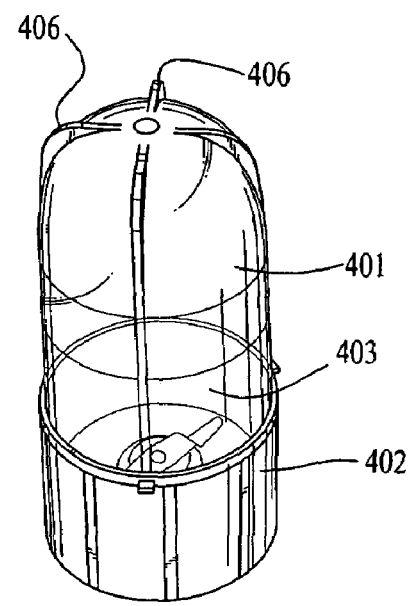
Figure 11C:
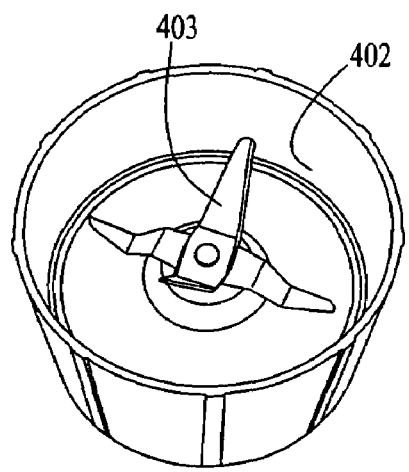
Figure 11D:
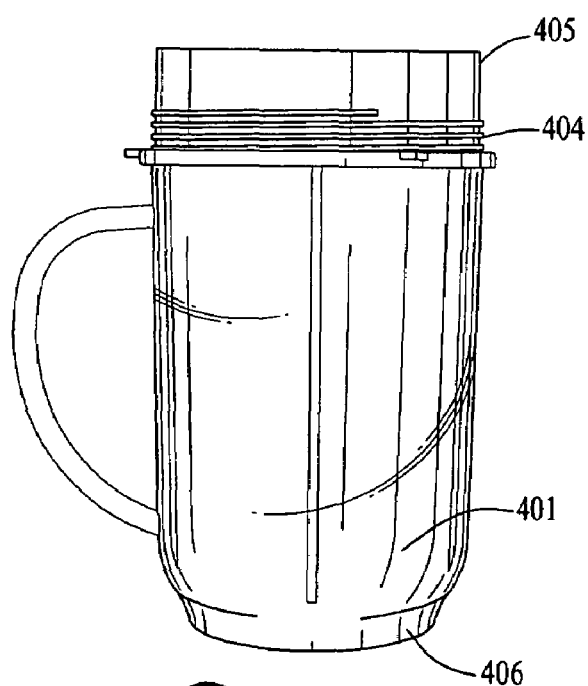
Figure 11:
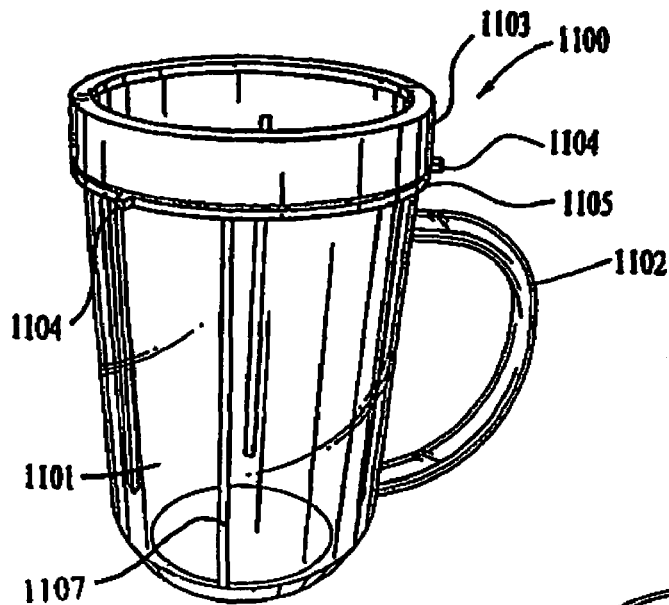

FIG. 11 illustrates one embodiment of a mug-type container 1100. The container 1100 includes at least one wall 1101 that defines a fluid containing area. As shown in the figure, the wall 1101 may be slightly tapered when moving from the mouth of the container 1100 to the base of the container 1100. The container 1100 also includes a mean for grasping or holding the container 1102. In another embodiment, the means may be a handle 1102, which is fixed to the outer wall 1101. In one embodiment, the handle 1102 is a generally U-shaped. In other exemplary embodiments, the handle 1102 may have an arcuate shape, a V-shape, or other shapes know or developed in the art.

The container 1100 may also include a plurality of locking members 1104 that are positioned about the periphery of the container 1100. In one embodiment, the locking members 1104 are protuberances that extend substantially perpendicular from the wall 1101 of the container 1100. Also as shown in FIG. 11, the locking members 1104 have a generally rectangular shape. As those skilled in the art will appreciate, locking members 1104 may have a plurality of different shapes. Container 1100 further includes a plurality of substantially elongated ridges 1107 (FIGS. 11-12, 14) integrally formed on the interior of the container body.

Figure 12:
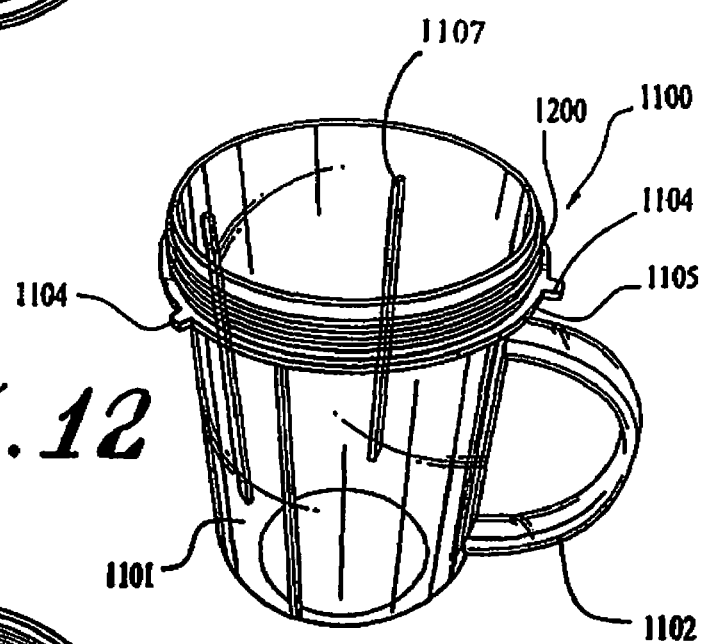
FIG. 12 is a perspective view of the embodiment of FIG. 11 with an exemplary embodiment of a ring removed from the mug.

As shown in FIG. 12, the container 1100 is provided with an attachment element 406, in this case a plurality of threads 1200 on the outer wall 1101 that allow the ring 1103 to be coupled to the container 1100. As shown in the embodiment depicted in FIG. 11, the locking members 1104 may be coupled to a ring-shaped ridge 1105. The ring-shaped ridge 1105 may also serve as a stop so that the ring 1103 is not over threaded beyond the opening of the container 1100.

Figure 13:
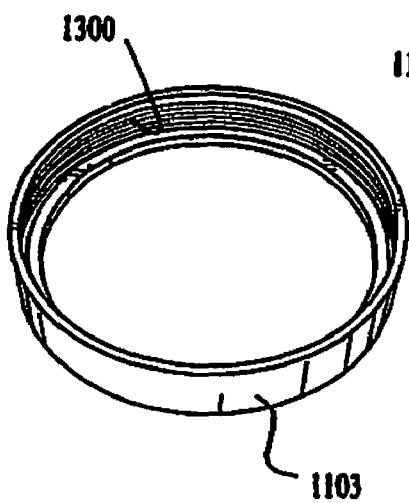
FIG. 13 is a bottom perspective view of ring of FIG. 12.

The container 1100 may also include a ring 1103 that is positioned atop the mouth of the container 1100. The ring 1103 may be fixed to the container 1100 via threads or other coupling means known or developed in the art. FIG. 13 shows one embodiment of the ring 1103 that may be coupled to the mouth of the container 1100. In one embodiment, the ring 1103 is a generally cylindrical wall having an outer surface and inner surface. The ring 1103 may include a plurality of threads 1300 that are found on the inner surface of the ring 1103. In another embodiment, the ring 1103 includes a top surface or lip that is coupled to the wall of the ring 1300. The ring 1103 may be coupled over the threads 1200 of the container 1100 so that it is easier for an individual to drink from the container 1100.

FIG. 14 illustrates one exemplary embodiment of the container 1100 as fixed to a blender base 110. According to one embodiment, the container 1100 is inverted and threadedly coupled to the blender base 110. In an alternative embodiment, the container 1100 may be coupled with a container base 202, 402. In either embodiment, container 1100 may then be inserted into the recess well 300 of the mixing base 100. As shown in FIG. 14, the base of the container 1100 is slightly tapered. The taper of the container 1100 creates a dome-like structure that facilitates the blending of the contents of the container 1100, although those skilled in the art will appreciate that numerous other interior shapes may be used with equivalent effect.

FIGS. 15 and 16 illustrate exemplary embodiments of a container cap 1500, 1600, respectively, that may be coupled to a container 101, 401, 1100. The cap 1500, 1600 contains a generally planar top surface 1502, 1103 and at least one sidewall 1503, 1604. According to various embodiments, the tops 1002, 1603 of the container cap 1500, 1600 and the sidewalls 1503, 1604 are generally perpendicular to one another. As those skilled in the art will appreciate, the caps 1500, 1600 may secure to the containers 101, 401, 1100 by a coupling means. In one embodiment, the coupling means may be a ridge and corresponding valley for a snap fit. In another embodiment, a close fitting friction fit may be used.

In another embodiment, the coupling means of the container cap 1500, 1600, may be a plurality of threads (not shown) on the inner surface of the wall 1503, 1604. The threads are sized to engage the threads that are on the plurality of the containers 101, 401, 1100 that are described herein, with or without the extension 405 described below.

As shown in FIG. 15, the container cap 1500 may include a plurality of openings 1501 that are spaced about the top of the container cap 1500. The openings 1501 may have varying sizes, shapes, and density on the cap 1500. As shown in FIGS. 15 and 16, these openings 1501, 1601, 1602 are generally circular in shape. As those skilled in the art will appreciate, these openings 1501, 1601, 1602 may have a plurality of different shapes know or developed in the art. Furthermore, the clustering or density of the openings on the cap 1500, 1600 may be varied depending upon intended use of the container cap 1500, 1600. For instance, the cap 1500, as shown in FIG. 15, may be used for shaking out large or coarse items that are contained within the container 1500. In FIG. 16, the openings 1601, 1602 being in closer proximity to each other may be useful for those blended items that have a smaller diameter or that may be poured or strained out of the container 1100.

FIGS. 17a through 17d are directed to several exemplary embodiments of the individualized container, all of which have a container body 401 with an attachment element 404 and a substantially smooth extension 405 beyond such attachment element 404 toward the open end of the container body 401. In one embodiment, the extension 405 is integrally formed into the container body 401.

One of the purposes for having such an extension is to allow the user to drink directly from the container body 401 without having his or her lips touch the attachment element, and without the need for a separate ring 1103. Certain attachment elements 404, for example the threads 1300 shown in FIG. 13, are uncomfortable to the lips, impair the user's ability to form a seal around the container during drinking, and tend to retain liquids in them after each sip. Therefore, when using the container body as a drinking vessel, it is advantageous to have a smooth surface that extends beyond the attachment element 404: the extension 405. Another advantage of the extension 405 is that it provides a clean surface for pouring, so that any residual contents that cling to the exterior of the container body 401 after pouring may be easily wiped off and will not get into the attachment element 404. Another advantage of the extension 405 is that it may easily be adapted to fit a variety of lids or caps 400, including snap-fit or friction fit lids, which may be used in addition to or in lieu of lids that secure to the container 401 via the attachment element 404. These lids or caps 400 may form a tight seal, or may have openings such as for a shaker/strainer as shown in FIGS. 15-16 and discussed above, or may incorporate spill-resistant travel or child lids that are known or may be developed in the art. The extension 405 need not be perfectly flat along the long axis of the container body 401, but rather should be free from significant protrusions or other features that would adversely affect the advantages discussed above. The distal end of the extension 405 preferably forms a sealing surface against which the container base 402 rests when the container body 401 and container base 402 are mated. In other embodiments, the sealing surface may be the interior and/or exterior sides of the extension 405. The sealing element to seal the container base 402 to the container body 401 may be accomplished by a resilient gasket, or any other methods of sealing that are known or may be developed in the art. The length of the extension along the long axis of the container body may be varied to fit the needs of drinking, pouring, or the fitting of lids, but in a preferred embodiment ranges from approximately 0.125 inches to approximately 1.0 inches. In another embodiment, the length of the extension ranges from approximately 0.25 inches to approximately 0.75 inches, which is a range of lengths that provides an adequate level of comfort for a user's lips while drinking, while not being overly long for the necessary components of the container body and/or lids, discussed below.

Figure 17A:
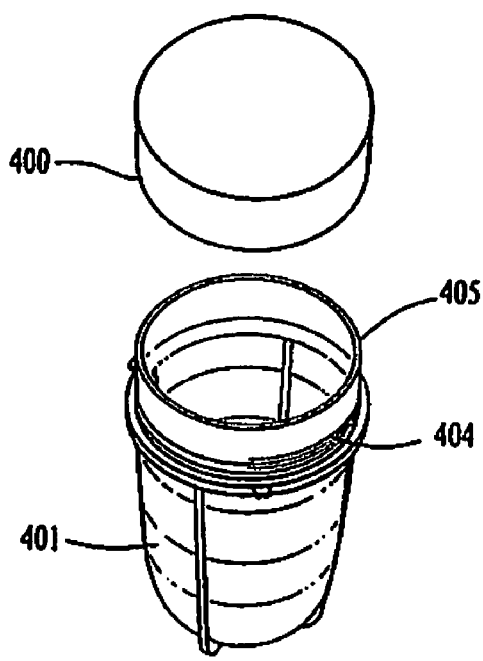
FIG. 17A is a perspective view of another exemplary embodiment of an individualized blender container and a lid.
Figure 17B:
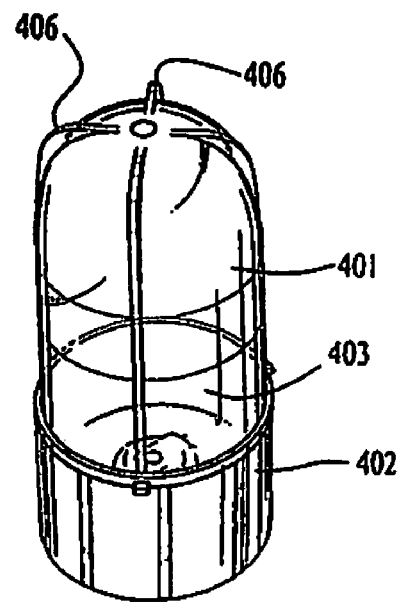
FIG. 17B is an inverted perspective view of FIG. 17A with an added container base.
Figure 17C:
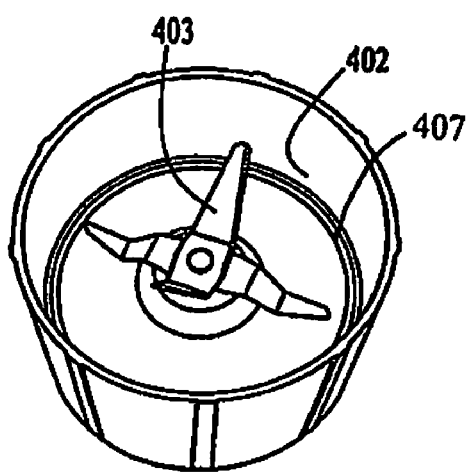
FIG. 17C is a perspective view of another exemplary embodiment of a container base.

When used with a container body 401 having an extension 405, the container base 402 is preferably taller than some of the other embodiments described herein, to place the structure that engages the attachment element 404 of the container body 401 in the proper position in the well of the container base 402. For example, in FIG. 17D, the attachment element 404 comprises a set of threads. The corresponding threads in the well of the of the container base 402 are located close to the top of the container base 402, while the lowest portion of the interior of the container base 402 is lower than the threads to accommodate the extension 405. As shown in FIG. 17C, the container base 402 preferably has agitating means 403 such as a mixer for agitating and mixing the contents. As with the other embodiments of the container base 202, 402, it is preferably sized to fit within the recessed well of the mixing base 100.

Figure 17D:
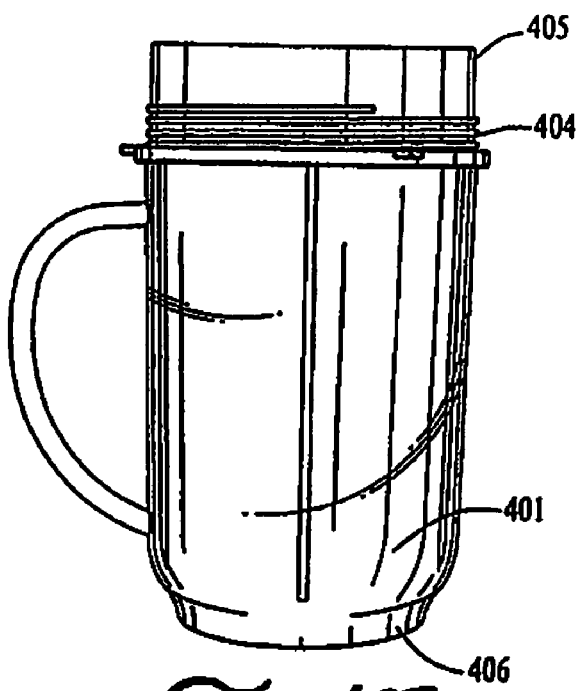
FIG. 17D is a side view of another exemplary embodiment of an individualized blender container.

As those skilled in the art will appreciate, the attachment element 404 may take numerous forms. As shown in FIG. 17D, one embodiment uses a set of threads formed in the container body 401 as the attachment element 404, with a corresponding set of threads in the container base 402. Another embodiment may use a plurality of pins formed in the container body and an "L" shaped slot formed in the interior of the container base 402, such that the pins are placed into the slots and rotated towards the horizontal part of the "L" to lock the container body 401 and the container base 402 together. Of course, that arrangement may be reversed, with the slots in the container body 401 and the pins in the container base 402. In other embodiments, friction-fit or snap-fit attachment elements 404 may be used, with the sealing element either as a gasket between the distal end of the container body 401 and the container base 402, or as part of the friction-fit or snap-fit mechanism. If the friction-fit or snap-fit attachment elements 404 are at or near the opening of the container body 401, they may have an added advantage of being able to either eliminate or shorten the extension 405, while still achieving the extension's advantages discussed above, so long as the friction-fit or snap-fit attachment elements 404 are sufficiently smooth to achieve those advantages. For example, a snap-fit ridge or valley may be integrated into the extension 405 along its exterior side, or a snap-fit ridge may be integrated at the extension's topmost edge, adjacent to the opening. In such embodiments, the snap-fit ridge or valley should be of a dimension that does not interfere with the purposes of the extension 405, described above, which may be accomplished with a snap-fit ridge or valley having a gently sloping side or sides. For a snap-fit ridge at the topmost edge of the extension 405, a slightly steeper side may be used, similar to a lip on a standard drinking glass. Other types of attachment elements 404 known or developed in the art may be used in conjunction with the embodiments disclosed here.

The container body 401 is preferably equipped with a standing element 406 that forms a stable platform for standing the container body 401 on a substantially flat surface with the opening facing upwards. The standing element 406 may take many forms, including the plurality of external ridges 102 discussed above and shown in FIGS. 2A-2D and 17B. Alternatively, the standing element 406 may simply be a flat surface formed in the exterior of the container body's closed end, such as shown in FIGS. 14 and 17D. Such flat surface could be narrower than the container body 401, as shown in FIGS. 14 and 17D, or have the same or larger dimensions than the container body 401. In yet another embodiment, the standing element 406 may comprise a stem and a flat base extending from the closed end of the container body, similar to a wine glass. In other embodiments, standing element 406 comprises three or more legs, in any conceivable shape, such as simple protrusions, or in whimsical forms such as rocket fins or duck feet. As those skilled in the art will appreciate, the standing element 406 may have innumerable forms.

As discussed above, the container body 101 may have a plurality of shapes known or developed in the art, and not just those depicted herein. For example, FIG. 17B depicts an elongated dome-shaped container body 401, while FIG. 17D depicts a container body 401 with more of a traditional drinking vessel shape, similar to a mug, which may or may not include a handle. Various other shapes may be used.

While the present invention has been described with regards to particular embodiments, it is recognized that additional variations of the present invention may be devised without departing from the inventive concept.

INDUSTRIAL APPLICABILITY

This invention industrially applies to the field of small appliances. More particularly, this invention industrially applies to the field of kitchen appliances. Even more particularly, this invention industrially applies to the field of electric blenders and containers related thereto.

What is claimed is:

1. A blender system, comprising:
a mixing base having a means for rotating a shaft, a recessed well positioned at a top of the mixing base, a pressure-actuated switch positioned about the periphery of the recessed well, and one or more locking grooves adjacent to and extending perpendicularly away from the pressure-actuated switch;
a container body comprising an opening at one end and a standing element at a second end, the body being tapered to a dome shape at the second end; a handle coupled to an exterior of the body; the body having a substantially smooth circumferential extension at the first end proximal to the opening, said extension being approximately 0.25 inch to approximately 1.0 inch so that a user's lips will engage only the extension when drinking from the container body; one or more locking members in spaced relation about a periphery of the opening of the body, wherein the locking members extend substantially perpendicularly from a wall of the container body and are engageable with the locking grooves; and one or more threads on the body positioned adjacent to the extension and distal to the opening;
a means for agitating contents of the container, the means selectively attachable and removable from the threads; and
a lid having a generally planar top and a lid wall coupled to a periphery of the top, the top having a plurality of openings, and wherein the lid is selectively attachable and removable from the threads.

2. The blender system of claim 1 wherein the agitating means comprises a container base and one or more blades rotatably coupled with the container base.

3. The blender system of claim 1 wherein the openings on the lid are positioned on a portion of the lid.

4. The blender system of claim 1 wherein the lid further comprises one or more threads positioned on an interior of the lid wall.

5. The blender system of claim 1 wherein the container further comprises one or more ridges positioned on an interior of the container body.

6. A blender system, comprising:
a mixing base having a means for rotating a shaft, a recessed well positioned at a top of the mixing base, a pressure-actuated switch positioned about the periphery of the recessed well, and one or more locking grooves adjacent to and extending perpendicularly away from the pressure-actuated switch;
a container body comprising an opening at a first end and a closed second end; the container body being tapered to a dome shape and having a standing element at the second end; the container body having a substantially smooth circumferential extension at the first end proximal to the opening; said extension being approximately 0.25 inch to approximately 1.0 inch so that a user's lips will engage only the extension when drinking from the container body; one or more locking members in spaced relation about a periphery of the opening of the container body, wherein the locking members extend substantially perpendicularly from the container body and are engageable with the locking grooves; an attachment element on the exterior of the container body positioned between the extension and the locking members; and
a means for agitating contents of the container body, the means selectively attachable and removable from the opening of the container body via the attachment element.

7. The blender system of claim 6 further comprising a lid having a generally planar top and a wall coupled to a periphery of the top, and wherein the lid is selectively attachable and removable from the opening of the container body.

8. The blender system of claim 6 wherein the attachment element further comprises one or more threads positioned adjacent to the extension and distal to the opening.

9. The blender system of claim 6 wherein the container body further comprises one or more ridges positioned on an interior of the body.

10. The blender system of claim 6 wherein the agitating means comprises a container base and one or more blades rotatably coupled with the container base.

* * * * *